United States Patent [19]

Korenaga

[11] Patent Number: 5,402,680
[45] Date of Patent: Apr. 4, 1995

[54] VELOCITY SENSOR AND SEMICONDUCTOR EXPOSING APPARATUS USING SUCH A SENSOR

[75] Inventor: Nobusige Korenaga, Sagamihara, Japan

[73] Assignee: Canon Kabushiki Kaisha, Tokyo, Japan

[21] Appl. No.: 986,901

[22] Filed: Dec. 8, 1992

[30] Foreign Application Priority Data

Dec. 10, 1991 [JP] Japan .................. 3-325801

[51] Int. Cl.$^6$ ............................................ G01P 3/22
[52] U.S. Cl. ........................ 73/518; 73/861.71; 324/661; 324/662; 324/161
[58] Field of Search ........... 73/861.71, 861.74, 861.75, 73/861.76, 518; 324/661, 662, 676, 679, 686, 160, 161, 175

[56] References Cited

U.S. PATENT DOCUMENTS

| | | | |
|---|---|---|---|
| 3,488,581 | 1/1970 | Foster | 324/662 |
| 4,451,780 | 5/1984 | Ogasawara | 324/662 |
| 4,550,616 | 11/1985 | Mott | 73/861.74 |
| 4,631,959 | 12/1986 | Motycka | 73/861.71 |
| 5,003,517 | 3/1991 | Greer, Jr. | 73/652 |

OTHER PUBLICATIONS

Rognert, et al., "Liga-based Flexible Microstructures for Fiber-Chip Coupling," J. Micromech. Microeng., Jun. 1991, pp. 167–170.

*Primary Examiner*—Tom Noland
*Assistant Examiner*—Helen C. Kwak
*Attorney, Agent, or Firm*—Fitzpatrick, Cella, Harper & Scinto

[57] ABSTRACT

A velocity sensor for detecting velocity even in a low velocity range has a velocity detecting element including a movable micromember, a deviation amount detecting device, a holding device and a velocity signal calculating device. The movable micromember is rotatably supported around a center of gravity for generating a frictional force or a dynamical pressure that is proportional to a velocity of a fluid. The deviation amount detecting device detects a deviation amount around the center of gravity of the movable micromember to generate an output voltage, which is proportional to the detected deviation amount. The holding device provides a holding force, which is proportional to the output voltage of the deviation amount detecting device, to the movable micromember and holds the movable micromember to a position around the center of gravity. The velocity signal calculating device calculates a velocity signal from the output of the deviation amount detecting device.

8 Claims, 7 Drawing Sheets

VELOCITY SENSOR AND SEMICONDUCTOR EXPOSING APPARATUS USING SUCH A SENSOR

BACKGROUND OF THE INVENTION

1. Field of the Invention

The invention relates to a velocity sensor and a semiconductor exposing apparatus in which such a velocity sensor is used as velocity detecting means in a mechanism such as an XY stage for mechanically and super-accurately positioning a sample.

2. Related Background Art

FIG. 6 is a schematic constructional view showing an example of conventional velocity detecting means of an XY stage of a semiconductor exposing apparatus.

The velocity detecting means is used to position an XY stage 14 which is guided by a movable X guide 12 and a fixed Y guide 13 and is moved on a fixed board 11 in the directions of X and Y axes shown in the drawing. The velocity detecting means comprises: a square mirror 21 provided on the XY stage 14; an X-axis laser interferometer to measure the position of the XY stage 14 in the direction of the X axis shown in the diagram; and a Y-axis laser interferometer to measure the position of the XY stage 14 in the direction of the Y axis shown in the drawing.

The X-axis laser interferometer comprises: a first laser light source 31 to emit a laser beam; a first bender 32 to change the progressing direction of the laser beam emitted from the first laser light source 31 to the X-axis direction shown in the drawing; a first polarizing beam splitter 33 to arrange the polarizing direction of the laser beam emitted from the first bender 32; and a first light amount sensor 34 to receive reflected light of the laser beam reflected by the square mirror 21. That is, the laser beam emitted from the first polarizing beam splitter 33 is reflected by the square mirror 21, after that, the reflected light again passes through the first polarizing beam splitter 33 and is received by the first light amount sensor 34. The Y-axis laser interferometer comprises: a second laser light source 41 to emit a laser beam; a second bender 42 to change the progressing direction of the laser beam emitted from the second laser light source 41 to the Y-axis direction shown in the drawing; a second polarizing beam splitter 43 to arrange the polarizing direction of the laser beam emitted from the second bender 42; and a second light amount sensor 44 to receive the reflected light of the laser beam reflected at the square mirror 21. That is, the laser beam emitted from the second polarizing beam splitter 43 is reflected by the square mirror 21, after that, the reflected light passes through the second polarizing beam splitter 43 and is received by the second light amount sensor 44. A first actuator (not shown) to generate a thrust to the fixed Y guide 13 is attached to the movable X guide 12. A second actuator (not shown) to generate a thrust to the movable X guide 12 is attached to the XY stage 14. Air slides (not shown) are provided between the movable X guide 12 and the fixed Y guide, between the movable X guide 12 and the fixed board 11, between the movable X guide 12 and the XY stage 14, and between the XY stage 14 and the fixed board 11, respectively.

The positions of the XY stage 14 in the X-axis and Y-axis directions shown in the drawing are measured by the X-axis laser interferometer and the Y-axis laser interferometer and the servo is applied to the first and second actuators, thereby positioning the XY stage 14. In this instance, in order to stabilize the servo system to reduce the positioning time, the first and second actuators generate resistance forces which are proportional to the velocity in the X-axis and Y-axis directions shown in the drawing. Therefore, the values of the necessary velocity in the X-axis and Y-axis directions shown in the drawing are obtained by calculating a difference between the position data of the XY stage 14 which are obtained by the X-axis and Y-axis laser interferometers.

However, the above conventional velocity detecting means has the following two problems.

(1) It is difficult to detect the velocity in a low velocity range before completion of the positioning operation. That is, in the semiconductor exposing apparatus, the positioning is ordinarily executed so as to obtain plus or minus ($\pm$) one resolution of the X-axis and Y-axis laser interferometers. A difference between the position data of the X-axis and Y-axis laser interferometers is calculated and a servo applying period of time is ordinarily set to 1 msec or less. Therefore, in a region where the positional deviation before completion of the positioning is within a range of plus or minus ($\pm$) a few resolutions, there is hardly a change in position for 1 msec. Therefore, in this region, the velocity feedback is not substantially performed. To stabilize the servo system, the gain cannot help dropping. Consequently, the time which is required for positioning increases or the accuracy against a disturbance deteriorates.

(2) Another vibrating mode (mainly, a rotating mode) is excited. That is, in the XY stage 14, several springs due to the compression properties of the air slides exist between the first and second actuators and the square mirror 21. For instance, the movable X guide 12 restricts the motions in the Y-axis and Z-axis directions shown in the drawing. Since the motions in the Y-axis and Z-axis directions shown in the drawing are restricted by air pressures, they are restricted by the compression properties of the air through the springs. Therefore, a rotating mode occurs. When a damping is applied by a velocity feedback in the X-axis direction shown in the drawing and the velocity feedback gain is raised, the rotating mode is excited. Therefore, the velocity feedback gain cannot sufficiently be increased. Eventually, a control frequency of the rigid mode cannot be sufficiently increased as well.

As one of the means for solving the above problems, there is known a method in, which when the velocity sensor fixed to an object to be measured has a relative velocity for an ambient fluid, a frictional force which occurs between the object and the fluid and is proportional to the relative velocity for the fluid is detected, thereby detecting the velocity of the object to be measured. However, even in this method, when the object to be measured moves at a super-low velocity, the frictional force that is detected by the velocity sensor is extremely small. There is a problem such that in a case having a velocity sensor of a size which is equal to or larger than about a few millimeters (mm), the above frictional force cannot be accurately detected. That is, a frictional force $F_1$ due to an interaction with the fluid is expressed as follows.

$$F_1 = k_1 \times \mu \times U/L \times d \times d \qquad (1)$$

where, $k_1$: proportional constant
$\mu$: coefficient of friction

U: relative velocity for the fluid
L: thickness of laminar flow boundary layer
d: dimensions of element of the velocity sensor which causes friction together with the fluid On the other hand, a frictional force $F_2$ which is subjected to the element of the velocity sensor that causes friction together with the fluid from a peripheral supporting portion (mainly, a bearing portion) is expressed as follows because it is proportional to the volume of the element.

$$F_2 = k_2 \times d \times d \times d \quad (2)$$

where, $k_2$: proportional constant

Therefore, the frictional force $F_1$ due to the interaction with the fluid is proportional to the square of the dimensions d of the element of the velocity sensor. On the other hand, the frictional force $F_2$ which is subjected from the peripheral supporting portion is proportional to the cube of the dimension d of the element of the velocity sensor. Therefore, in a case having the velocity sensor of a size which is equal to or larger than about a few millimeters (mm), the frictional force $F_2$ which is subjected from the peripheral supporting portion is sufficiently larger than the frictional force $F_1$ due to the interaction with the fluid. Therefore, the frictional force $F_1$ due to the interaction with the fluid cannot be detected.

SUMMARY OF THE INVENTION

It is an object of the invention to provide a velocity sensor which can accurately detect a velocity even in a low velocity range and also to provide a semiconductor exposing apparatus using such a velocity sensor.

To accomplish the above object, according to the invention, there is provided a velocity sensor including a velocity detecting element, wherein the velocity detecting element comprises: a movable micromember which is rotatably supported around a center of gravity and generates a frictional force or a dynamical pressure that is proportional to a velocity of a fluid; deviation amount detecting means for detecting a deviation amount around the center of gravity of the movable micromember and for generating an output voltage which is proportional to the detected deviation amount; holding means for giving a holding force which is proportional to the output voltage of the deviation amount detecting means to the movable micromember and for holding the movable micromember to a position around the center of gravity; and velocity signal calculating means for calculating a velocity signal from the output voltage of the deviation amount detecting means.

It is also possible that the dimension d of the movable micromember satisfies the following relation:

$$d \leq (k_1 \times \rho \times U/L)/(10 \times k_2)$$

where, U: relative velocity with the fluid
L: thickness of laminar flow boundary layer
$\mu$: coefficient of friction with the fluid
$k_1, k_2$: proportional constants The movable micromember has a disc-like shape. A group of gear-shaped projections and a projection to detect a position are formed around the outer periphery. A bearing is provided at the position of the center of gravity.

The deviation amount detecting means has: first and second position detecting electrodes which are provided so as to respectively face the position detecting projection of the movable micromember with microgaps; first and second capacitance detection circuits for respectively detecting an electrostatic capacitance between the position detecting projection and the first position detecting electrode and an electrostatic capacitance between the position detecting projection and the second position detecting electrode; and a differential amplifier to which output signals of the first and second capacitance detection circuits are respectively supplied.

The holding means has: a driving electrode having convex portions each of which faces each of the projections of the movable micromember so as to have a microgap; and a voltage amplifier for amplifying an output voltage of the differential amplifier and far supplying the amplified voltage to the driving electrode.

The velocity signal calculating means has a square arithmetic circuit to calculate a velocity signal by squaring an output voltage of the differential amplifier.

Further, the movable micromember has a shape in which a fan-shaped portion and a rectangular portion are integrally formed. A bearing is provided at the position of a center of gravity.

The deviation amount detecting means has: first and second position detecting electrodes which are respectively provided so as to face both side surfaces of the fan-shaped portion of the movable micromember with microgaps; first and second capacitance detection circuits for respectively detecting an electrostatic capacitance between the fan-shaped portion of the movable micromember and the first position detecting electrode and an electrostatic capacitance between the fan-shaped portion of the movable micromember and the second position detecting electrode; and a differential amplifier to which output signals of the first and second capacitance detection circuits are respectively supplied.

The holding means has: a driving electrode which is provided so as to face the fan-shaped portion of the movable micromember with a microgap; and a voltage amplifier for amplifying an output voltage of the differential amplifier and for supplying the amplified voltage to the driving electrode.

The velocity signal calculating means has a square arithmetic circuit to calculate a velocity signal by squaring an output voltage of the differential amplifier.

It is also possible that the dimension d of the movable micromember satisfies the following relation:

$$d \leq (k_1 \times \rho \times U^2)/(10 \times k_2)$$

where, U: relative velocity with the fluid
$\rho$: density of fluid
$k_1, k_2$: proportional constants.

According to the velocity sensor of the invention, the frictional force or dynamical pressure which is generated in the movable micromember and is proportional to the velocity of the fluid is made equal to the holding force which is given from the holding means to the movable micromember in order to hold the movable micromember to the position around the center of gravity. Therefore, a predetermined relation can be provided between the deviation amount of the movable micromember which has been detected by the deviation amount detecting means and the velocity of the fluid. Consequently, the velocity signal can be calculated by the velocity signal calculating means from the output voltage of the deviation amount detecting means. That is, according to the velocity sensor of the invention, by paying attention to the following equation:

$$F_1/F_2 = k_3 \times \mu \times U/L/d \quad (3)$$

where, $k_3$: proportional constant. From the above equations (1) and (2), the dimension d in the equation (3) is sufficiently reduced by using the movable micrometer, thereby setting the frictional force $F_1$ due to the interaction with the fluid to be sufficiently larger than the frictional force $F_2$ that is subjected from the peripheral supporting portion and improving the detecting accuracy of the frictional force $F_1$ due to the interaction with the fluid.

BRIEF DESCRIPTION OF THE DRAWINGS

FIGS. 1A and 1B are diagrams showing the first embodiment of a velocity sensor of the invention, in which FIG. 1A is a whole perspective view and FIG. 1B is a schematic constructional diagram of a velocity detecting element;

FIGS. 3A and 3B are diagrams showing the second embodiment of a velocity sensor according to the invention, in which FIG. 3A is a whole perspective view and FIG. 3B is a perspective view of a movable micromember;

DETAILED DESCRIPTION OF THE PREFERRED EMBODIMENTS

Embodiments of the invention will be described hereinbelow with reference to the drawings.

Figure 1A:
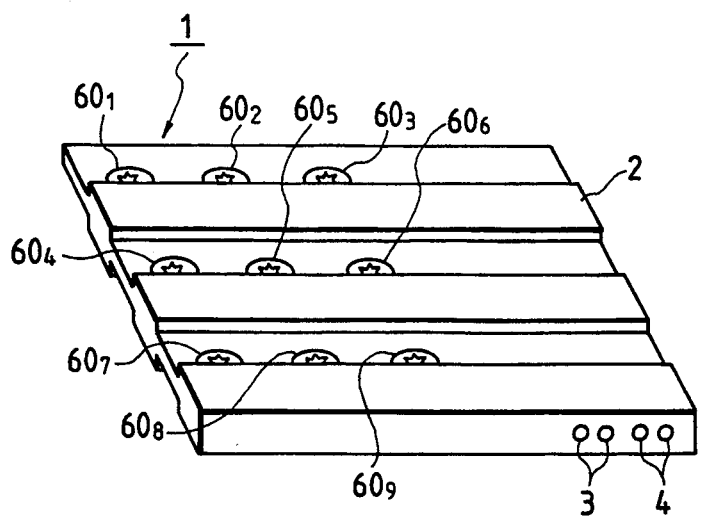
Figure 1B:
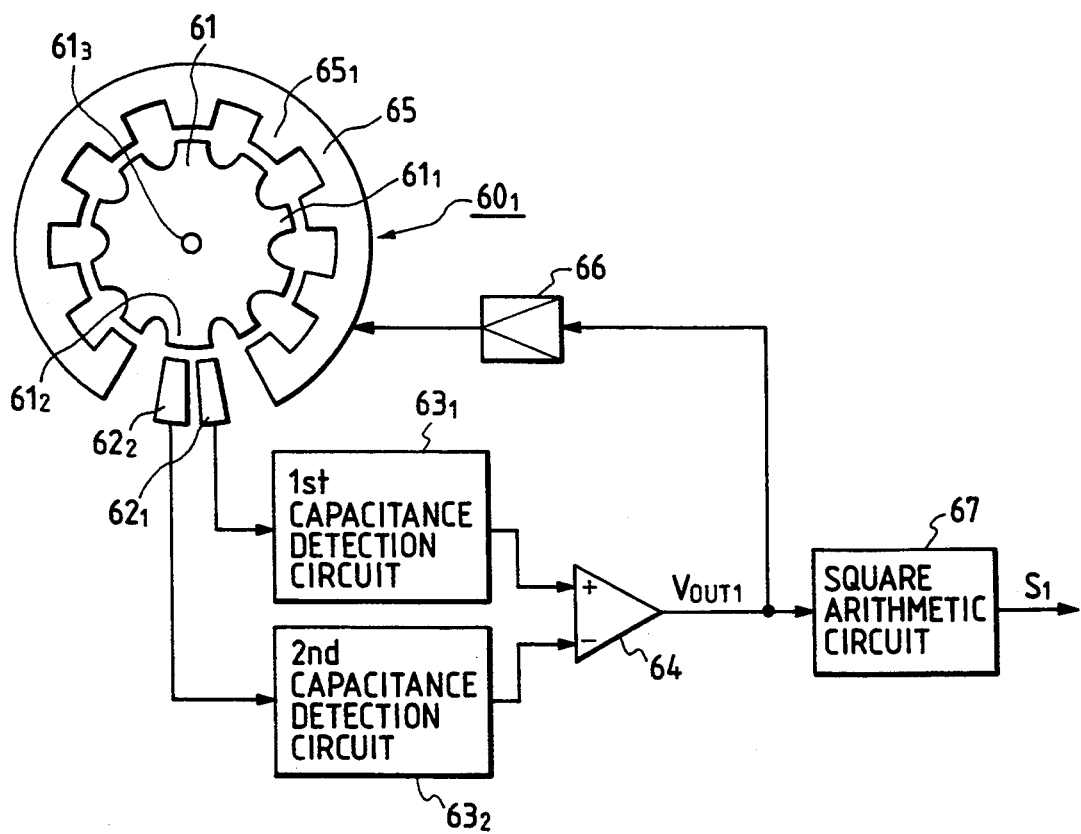

FIGS. 1A and 1B are diagrams showing the first embodiment of a velocity sensor of the invention.

As shown in FIG. 1A, a velocity sensor 1 comprises: a casing 2 having a power lead-in terminal 3 and a velocity signal output terminal 4; and nine velocity detecting elements $60_1$ to $60_9$ which are fixed in three lines on the upper surface of the casing 2 every three elements. Each of the velocity detecting elements $60_1$ to $60_9$ has: a movable micromember 61 which is rotatably supported around the center of gravity and generates a frictional force that is proportional to a velocity of a fluid; deviation amount detecting means for detecting a deviation amount around the center of gravity of the movable micromember 61 and for generating an output voltage which is proportional to the detected deviation amount; holding means for giving a holding force which is proportional to the output voltage of the deviation amount detecting means to the movable micromember 61 and holding the movable micromember 61 to a fixed position around the center of gravity; and velocity signal calculating means for calculating a velocity signal from the output voltage of the deviation amount detecting means.

Component elements of each of the velocity detecting elements $60_1$ to $60_9$ will now be described hereinbelow with reference to FIG. 1B.

(1) Movable Micromember 61

The movable micromember 61 has a disc-like shape. A group of gearteeth-shaped projections $61_1$ and a position detecting projection $61_2$ are integrally formed around the outer periphery of the movable micromember. A bearing $61_3$ is provided at the position of the center of gravity of the movable micromember 61. The bearing $61_3$ is rotatably fitted to a shaft (not shown) provided for the casing 2 and the movable micromember 61 is fixed to the casing 2, thereby making the movable micromember 61 rotatable around the center of gravity. In order to allow the movable micromember 61 to generate a frictional force which is proportional to the velocity of the ambient fluid, as shown in FIG. 1A, the portion on the side opposite to the position detecting projection $61_2$ than the bearing $61_3$ of the movable micromember 61 is exposed so as to be in contact with the fluid. The remaining portion of the movable micromember 61 is covered by the casing 2 so as not to be in contact with the fluid.

(2) Deviation Amount Detecting Means

The deviation amount detecting means comprises: first and second position detecting electrodes $62_1$ and $62_2$ which are provided so as to face the position detecting projection $61_2$ of the movable micromember 61 with microgaps, respectively; first and second capacitance detection circuits $63_1$ and $63_2$ to detect an electrostatic capacitance between the position detecting projection $61_2$ and the first position detecting electrode $62_1$ and an electrostatic capacitance between the position detecting projection $61_2$ and the second position detecting electrode $62_2$, respectively; and a differential amplifier 64 in which an output signal of the first capacitance detection circuit $63_1$ is supplied to a plus input terminal and an output signal of the second capacitance detection circuit $63_2$ is supplied to a minus input terminal.

The first and second position detecting electrodes $62_1$ and $62_2$ are provided at the positions such that when the group of projections $61_1$ of the movable micromember 61 and a group of convex portions $65_1$ of a driving electrode 65, which will be explained hereafter, come to the positions where they face each other, the electrostatic capacitance between the position detecting projection $61_2$ of the movable micromember 61 and the first position detecting electrode $62_1$ is equal to the electrostatic capacitance between the position detecting projection $61_2$ of the movable micromember 61 and the second position detecting electrode $62_2$.

(3) Holding Means

The holding means comprises: a driving electrode 65 formed with convex portions $65_1$ which face the projections $61_1$ of the movable micromember 61 so as to have microgaps, respectively; and a voltage amplifier 66 for amplifying an output voltage $V_{OUT1}$ of the differential amplifier 64 and for supplying the amplified voltage to the driving electrode 65.

(4) Velocity Signal Calculating Means

The velocity signal calculating means comprises a square arithmetic circuit 67 for calculating a velocity signal $S_1$ by squaring the output voltage $V_{OUT1}$ of the differential amplifier 64 and for supplying the squared voltage to an adder (not shown).

Each of the remaining velocity detecting elements $60_2$ to $60_9$ also has a construction similar to the velocity detecting element $60_1$ mentioned above. An output signal of the adder is taken to the outside from the velocity signal output terminal 4 (refer to FIG. 1A).

As mentioned above, each of the velocity detecting elements $60_1$ to $60_9$ constructing the velocity sensor 1 has a structure similar to that of a wellknown static motor which is formed by a combination of a sacrifice layer etching and an LIGA process in the micromechatronics technique (KAST Report, Vol. 2, No. 4, 1991) using a semiconductor lithography technique. Therefore, each of the velocity detecting elements $60_1$ to $60_9$ can be manufactured by dimensions such that the frictional force $F_1$ due to the interaction with the fluid in the above equation (3) can be set to be sufficiently larger than the frictional force $F_2$ that is subjected from the peripheral supporting portion. The LIGA process is described, for example, in J. Micromech Microeng. 1, pages 167 to 170, 1991.

The operation of the velocity sensor 1 will now be described.

When the measurement object to which the velocity sensor 1 is attached moves at a velocity v, a frictional force $T_v$ is generated in the portion (exposed portion) on the side opposite to the position detecting projection $61_2$ than the bearing $61_3$ of the movable micromember 61 due to the friction with the ambient fluid. In this instance, even if the measurement object has an acceleration, the acceleration is balanced with a reaction from the bearing $61_3$, so that the frictional force $T_v$ which is generated in the movable micromember 61 is proportional to the velocity v. When the frictional force $T_v$ is generated in the movable micromember 61, the movable micromember 61 rotates around the bearing $61_3$, so that the position detecting projection $61_2$ is deviated from the positions opposite to the first and second position detecting electrodes $62_1$ and $62_2$. However, when the electrostatic capacitance difference according to the deviation amount is detected by the first and second capacitance detection circuits $63_1$ and $63_2$ and the voltage (output voltage $V_{OUT1}$ of the differential amplifier 64) which is proportional to such a capacitance difference is given to the driving electrode 65 through the voltage amplifier 66, a holding force $T_h$ is applied to the movable micromember 61 and the movable micromember 61 is returned to the original position.

A balance state of the holding force $T_h$ and the frictional force $T_v$ is now considered, a potential difference between the projection $61_1$ of the movable micromember 61 and the convex portion $65_1$ of the driving electrode 65 is set to E, an exceeding length in the circumferential direction of the projection $61_1$ of the movable micromember 61 is set to W, a deviation amount between the projection $61_1$ of the movable micromember 61 and the convex portion $65_1$ of the driving electrode 65 is set to $\Delta W$ ($\Delta W << W$), and a voltage which is applied to the driving electrode 65 by the voltage amplifier 66 is set to $V_1$. In this instance, the deviation amount $\Delta W$ corresponds to the output voltage $V_{OUT1}$ of the differential amplifier 64. The output voltage $V_{OUT1}$ of the differential amplifier 64 is amplified by the voltage amplifier 66 and the voltage $V_1$ is determined. Therefore, the following equation is satisfied:

$$V_1 = K_1 \times V_{OUT1} \qquad (4)$$
$$= K_2 \times \Delta W$$

where, $K_1$, $K_2$: proportionality constants. Therefore, assuming that a microgap amount between the projection 611 of the movable micromember 61 and the convex portion 651 of the driving electrode 65 is set to g, the following equation is satisfied:

$$E = V_1/g \qquad (5)$$
$$= K_2 \times \Delta W/g$$

Thus, the holding force $T_h$ is expressed as follows:

$$T_h = K_3 \times \epsilon \times E \times E \qquad (6)$$
$$= K_4 \times \Delta W \times \Delta W$$

where, $K_3$, $K_4$: proportionality constants.

On the other hand, since the frictional force $T_v$ is proportional to the velocity v, it is expressed as follows:

$$T_v = K_5 \times v \qquad (7)$$

where, $K_5$: proportionality constant.

Therefore, since the holding force $T_h$ and the frictional force $T_v$ are balanced, $$v = K_6 \times \Delta W \times \Delta W \qquad (8)$$
$$= K_7 \times V_{OUT1} \times V_{OUT1}$$

where, $K_6$, $K_7$: proportionality constants is satisfied. Therefore, by squaring the output voltage $V_{OUT1}$ of the differential amplifier 64 by square arithmetic circuit 67, the velocity signal $S_1$ which is proportional to the velocity v can be obtained.

The velocity signals $S_1$ to $S_9$ obtained by the velocity detecting elements $60_1$ to $60_9$ as mentioned above are added by the adder. After that, the addition signal is taken to the outside from the velocity signal output terminal 4.

Figure 2:
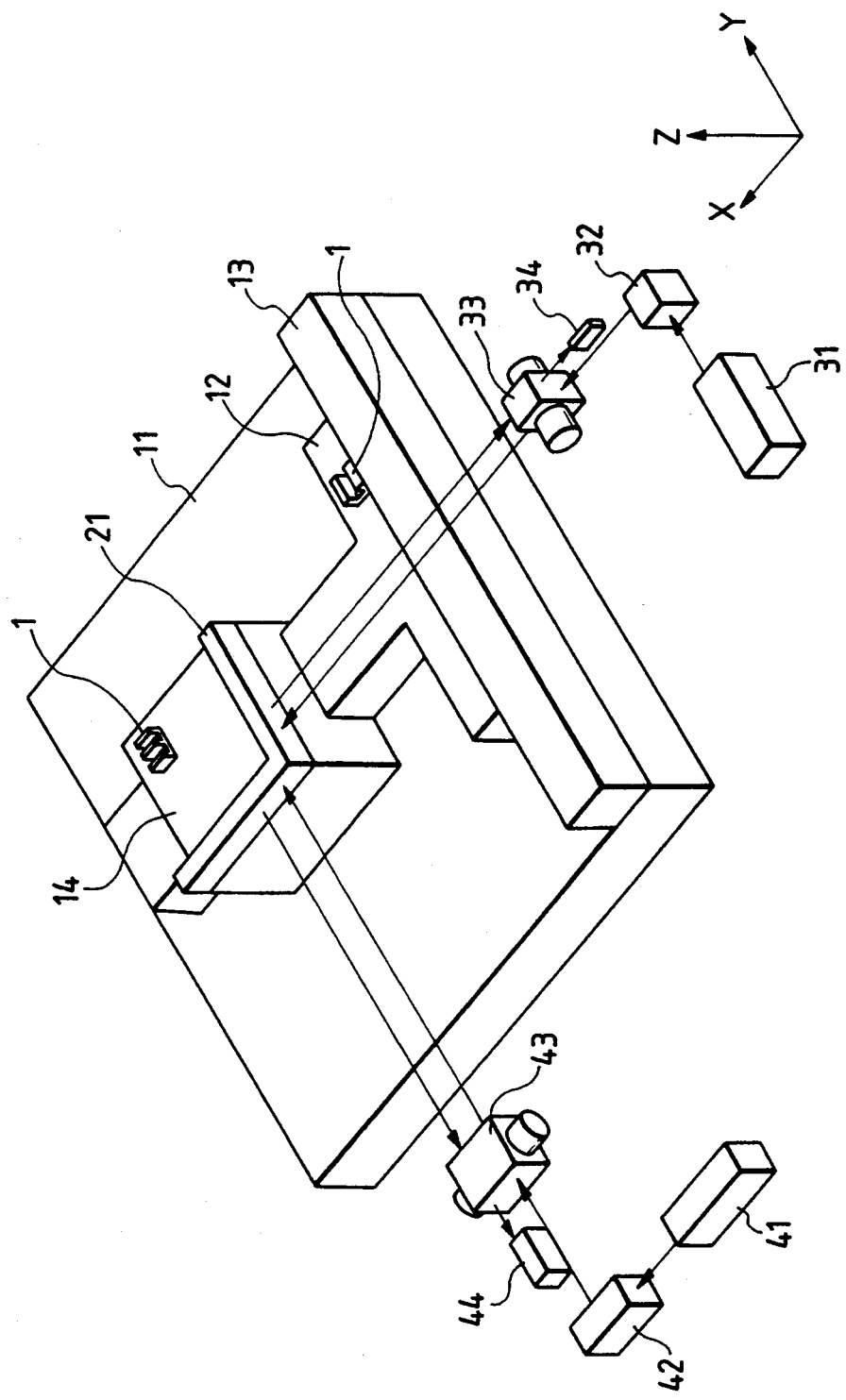
FIG. 2 is a schematic constructional diagram in the case where an X-axis laser interferometer and a Y-axis laser interferometer shown in FIG. 6 and two velocity sensors shown in FIG. 1A and 1B are combined and used as velocity detecting means of an XY stage of a semiconductor exposing apparatus shown in FIG. 6.
Figure 6:
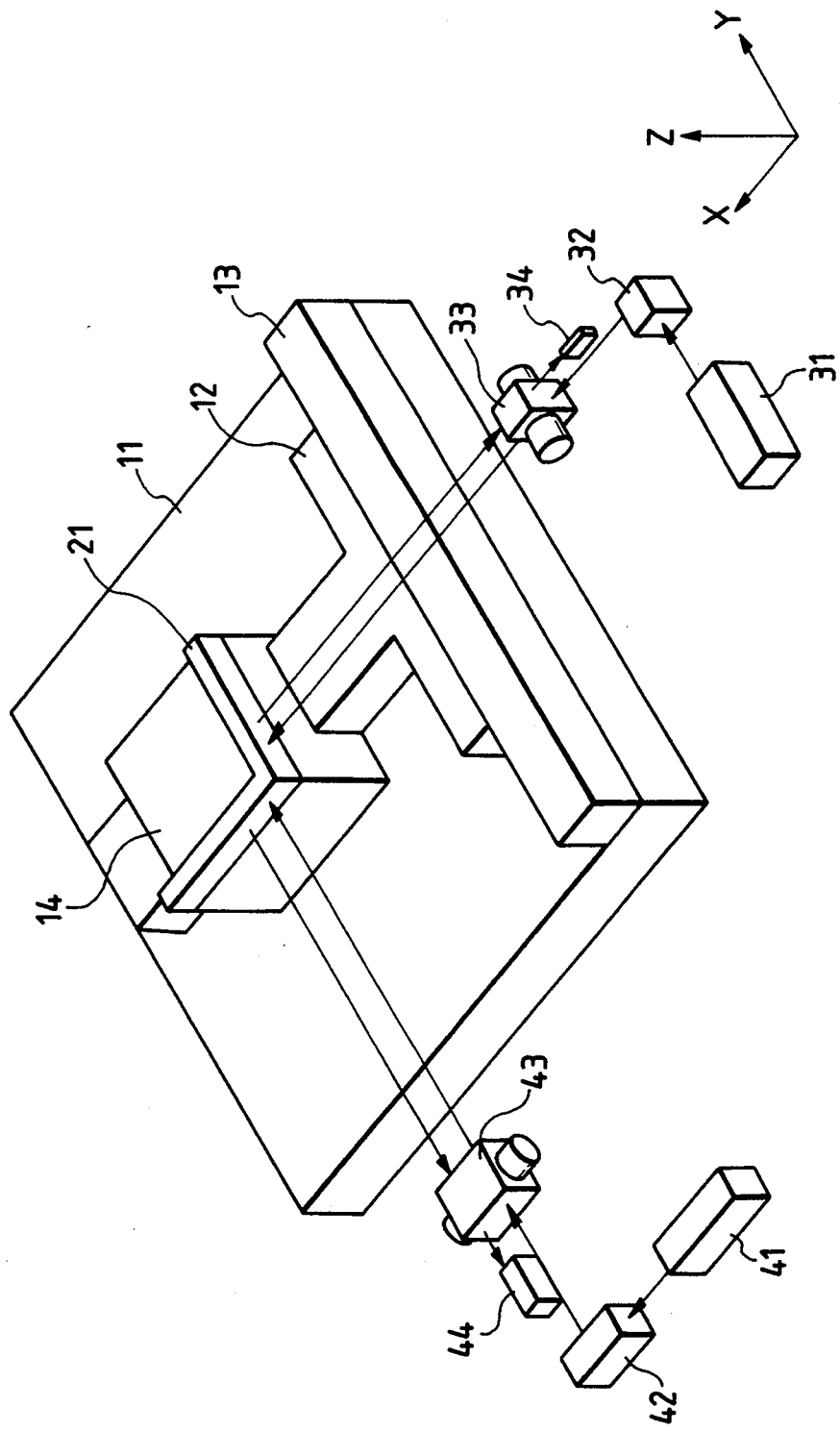
FIG. 6 is a schematic constructional diagram showing an example of conventional velocity detecting means of an XY stage of a semiconductor exposing apparatus.

FIG. 2 is a schematic constructional diagram when a combination of an X-axis laser interferometer and a Y-axis laser interferometer shown in FIG. 6 and two velocity sensors 1 shown in FIG. 1 is used as velocity detecting means of the XY stage of a semiconductor exposing apparatus shown in FIG. 6.

BY fixing one velocity sensor 1 onto the XY stage 14 and by fixing one velocity sensor 1 onto the movable X guide 12, it is possible to perform the velocity detection in a low velocity range before completion of the positioning, which was difficult in a case of using only the X-axis and Y-axis laser interferometer. The reason why two velocity sensors 1 are used is because the velocity in only the direction of one axis can be detected when one velocity sensor 1 is used.

Figure 3A:
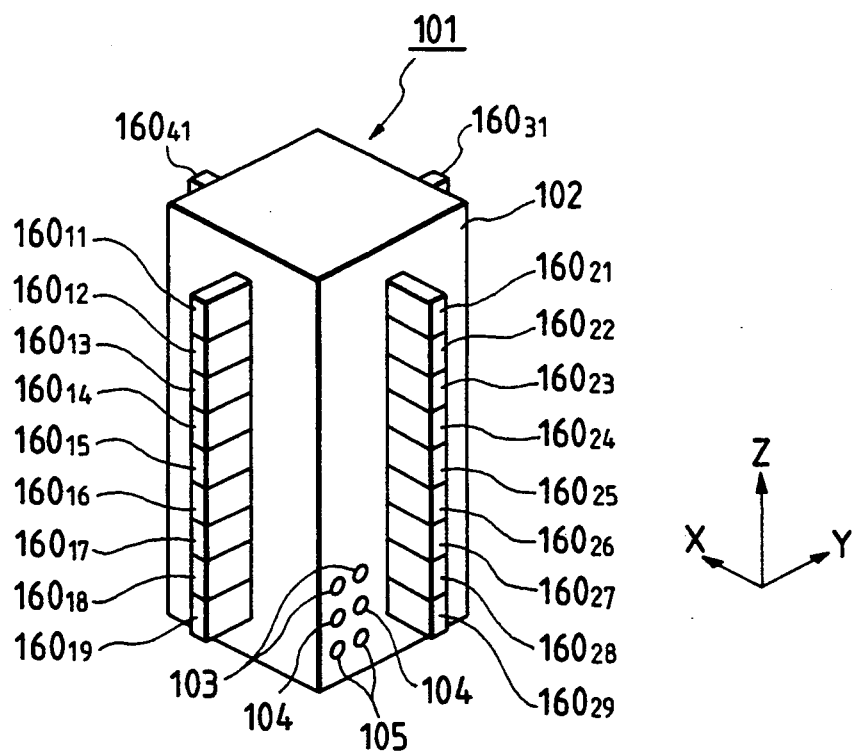
Figure 3B:
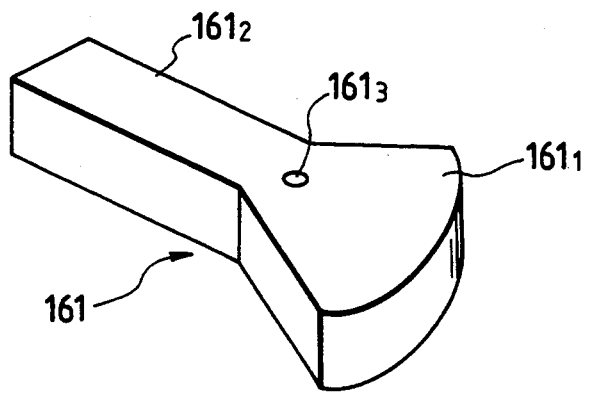

FIGS. 3A and 3B show the second embodiment of a velocity sensor according to the invention.

As shown in FIG. 3A, a velocity sensor 101 comprises: a casing 102 having a power lead-in terminal 103, an X-axis direction velocity signal output terminal 104, and a Y-axis direction velocity signal output terminal 105; and velocity detecting elements $160_{11}$ to $160_{19}$, $160_{21}$ to $160_{29}$, $160_{31}$ to $160_{39}$, and $160_{41}$ to $160_{49}$ (velocity detecting elements $160_{32}$ to $160_{39}$ and $160_{42}$ to $160_{49}$ are not shown) which are fixed to each side surface of the casing 102 every nine elements. Each of the velocity detecting elements $160_{11}$ to $160_{19}$, $160_{21}$ to $160_{29}$, $160_{31}$ to $160_{39}$, and $160_{41}$ to $160_{49}$ has: a movable micromember 161 which is rotatably supported around the center of gravity and generates a dynamical pressure which is proportional to the velocity of a fluid; deviation amount detecting means for detecting a deviation amount around the center of gravity of the movable micromember 161 and for generating an output voltage which is proportional to the detected deviation amount; holding means for giving a holding force which is proportional to the output voltage of the deviation amount detecting means to the movable micromember 161 and holding the movable micromember 161 to a fixed position around the center of gravity; and velocity signal calculating means for calculating a velocity signal from the output voltage of the deviation amount detecting means.

Figure 4:
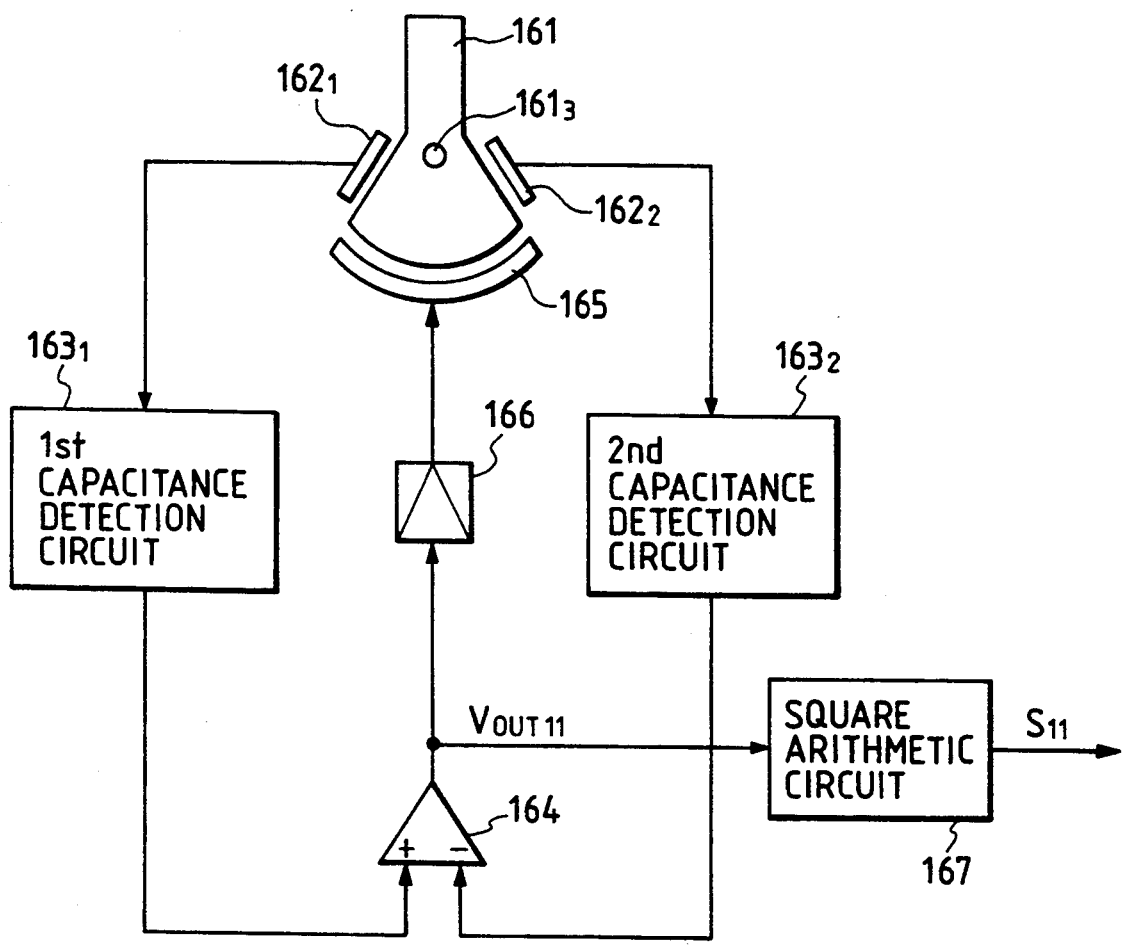
FIG. 4 is a schematic constructional diagram of the velocity detecting element shown in FIG. 3.

The component elements of each of the velocity detecting elements $160_{11}$ to $160_{19}$, $160_{21}$ to $160_{29}$, $160_{31}$ to $160_{39}$, and $160_{41}$ to $160_{49}$ will now be described hereinbelow with reference to FIGS. 3B and 4.

(1) Movable Micromember 161

As shown in FIG. 3B, the movable micromember 161 is constructed by integrally forming a fan-shaped portion $161_1$ and a rectangular portion $161_2$. A bearing $161_3$ is provided at the position of the center of gravity of the movable micromember 161. The bearing $161_3$ is rotatably fitted to a shaft (not shown) provided for the casing 102 and the movable micromember 161 is fixed to the casing 102, thereby making the movable micromember 161 rotatable around the center of gravity. To allow the movable micromember 161 to generate a dynamical pressure which is proportional to the velocity of ambient fluid, as shown in FIG. 3A, the rectangular portion $161_2$ of the movable micromember 161 is exposed so as to be in contact with the fluid, while the fan-shaped portion $161_1$ of the movable micromember 161 is covered by the casing 102 so as not to be in contact with the fluid. A thickness of movable micromember 161 is set to a large value in order to receive the dynamical pressure rather than the frictional force as an interaction with the fluid.

(2) Deviation Amount Detecting Means

The deviation amount detecting means comprises: first and second position detecting electrodes $162_1$ and $162_2$ which are respectively provided so as to face both side surfaces (left and right side surfaces shown in FIG. 4) of the fan-shaped portion $161_1$ of the movable micromember 161 with microgaps; first and second capacitance detection circuits $163_1$ and $163_2$ to respectively detect an electrostatic capacitance between the fan-shaped portion $161_1$ of the movable micromember 161 and the first position detecting electrode $162_1$ and an electrostatic capacitance between the fan-shaped portion $161_1$ of the movable micromember 161 and the second position detecting electrode $162_2$; and a differential amplifier 164 in which an output signal of the first capacitance detection circuit $163_1$ is supplied to a plus input terminal and an output signal of the second capacitance detection circuit $163_2$ is supplied to a minus input terminal.

The first and second position detecting electrodes $162_1$ and $162_2$ are attached at the positions such that when the curved surface of the fan-shaped portion $161_1$ of the movable micromember 161 and a driving electrode 165, which will be explained hereinafter, come to the positions where they face each other, the electrostatic capacitance between the fan-shaped portion $161_1$ of the movable micromember 161 and the first position detecting electrode $162_1$ is equal to the electrostatic capacitance between the fan-shaped portion $161_1$ of the movable micromember 161 and the second position detecting electrode $162_2$.

(3) Holding Means

The holding means comprises: a driving electrode 165 which is provided so as to face the fan-shaped portion $161_1$ of the movable micromember 161 with a microgap; and a voltage amplifier 166 for amplifying an output voltage $V_{OUT11}$ of the differential amplifier 164 and supplying the amplified voltage to the driving electrode 165.

(4) Velocity Signal Calculating Means

The velocity signal calculating means comprises a square arithmetic circuit 167 for calculating a velocity signal $S_{11}$ by squaring the output voltage $V_{OUT11}$ of the differential amplifier 164 and supplying the squared voltage to a first adder (not shown).

Each of the remaining velocity detecting elements $160_{12}$ to $160_{19}$, $160_{21}$ to $160_{29}$, $160_{31}$ to $160_{39}$, and $160_{41}$ to $160_{49}$ also has a construction similar to the velocity detecting elements $160_{11}$ mentioned above. Velocity signals $S_{11}$ to $S_{19}$ and $S_{31}$ to $S_{39}$ which are generated from the velocity detecting elements $160_{11}$ to $160_{19}$ and $160_{31}$ to $160_{39}$ are added by the first adder. After that, the addition signal is taken to the outside from the X-axis direction velocity signal output terminal 104 (refer to FIG. 3A). Velocity signals $S_{21}$ to $S_{29}$ and $S_{41}$ to $S_{49}$ which are generated from the velocity detecting elements $160_{21}$ to $160_{29}$ and $160_{41}$ to $160_{49}$ are added by a second adder (not shown). After that, the addition signal is taken to the outside from the Y-axis direction velocity signal output terminal 105 (refer to FIG. 3A).

As mentioned above, each of the velocity detecting elements $160_{12}$ to $160_{19}$, $160_{21}$ to $160_{29}$, $160_{31}$ to $160_{39}$, and $160_{41}$ to $160_{49}$ constructing the velocity sensor 101 can be manufactured by a combination of a sacrifice layer etching and the LIGA process in the micromechatronics technique using the semiconductor lithography technique. Therefore, each of the velocity detecting elements $160_{12}$ to $160_{19}$, $160_{21}$ to $160_{29}$, $160_{31}$ to $160_{39}$, and $160_{41}$ to $160_{49}$ can be manufactured by the dimensions such that the frictional force $F_1$ due to the interaction with the fluid in the above equation (3) can be set to be sufficiently larger than the frictional force $F_2$ that is subjected from the peripheral supporting portion.

The operation of the velocity sensor 101 will now be described.

When a measurement object to which the velocity sensor 101 is attached moves at a velocity v in the direction of the X axis, a dynamical pressure $T_w$ is generated in the rectangular portion $161_2$ (exposed portion) of the movable micromember 161 due to the dynamical pressure from the ambient fluid (and a slight frictional force). In this instance, even when the measurement object has an acceleration, the acceleration is balanced to the reaction from the bearing $161_3$, so that the dynamical pressure $T_w$ occurring in the movable micromember 161 is proportional to the velocity v. When the dynamical pressure $T_w$ is generated in the movable micromember 161, the movable micromember 161 rotates around the bearing $161_3$, so that the 1 fan-shaped portion $161_1$ of the movable micromember 161 is deviated from the positions where it faces the first and second position detecting electrodes $162_1$ and $162_2$. However, since a difference between the electrostatic capacitances according to the deviation amount is detected by the first and second capacitance detection circuits $163_1$ and $163_2$ and the voltage (output voltage $V_{OUT11}$ of the differential amplifier 164) which is proportional to the capacitance difference is given to the driving electrode 165 through the voltage amplifier 166, the holding force $T_h$ is applied to the movable micromember 161 and the movable micromember 161 is returned to the original position.

A state in which the holding force $T_h$ and the dynamical force $T_w$ are balanced is now considered. It is assumed that a potential difference between the fan-shaped portion $161_1$ of the movable micromember 161 and the driving electrode 165 is set to E, an exceeding length in the circumferential direction of the fan-shaped portion $161_1$ of the movable micromember 161 is set to W, a deviation amount between the fanshaped portion $161_1$ of the movable micromember 161 and the driving electrode 165 is set to $\Delta W(\Delta W<<W)$, and a voltage which is applied to the driving electrode 165 by the voltage amplifier 166 is set to $V_{11}$. In this case, the deviation amount $\Delta W$ corresponds to the output voltage $V_{OUT11}$ of the differential amplifier 164. The output voltage $V_{OUT11}$ of the differential amplifier 164 is amplified by the voltage amplifier 166 and the voltage $V_{11}$ is determined. Therefore, $$V_{11} = K_{11} \times V_{OUT11} \qquad (9)$$
$$= K_{12} \times \Delta W$$

where, $K_{11}$, $K_{12}$: proportionality constants is satisfied. Therefore, assuming that a microgap amount between the fan-shaped portion $161_1$ of the movable micromember 161 and the driving electrode 165 is set to g, $$E = V_{11}/g \qquad (10)$$
$$= K_{12} \times \Delta W/g$$

is satisfied. Thus, the holding force $T_h$ is expressed by the following equation:

$$T_h = K_{13} \times \epsilon \times E \times E \qquad (11)$$
$$= K_{14} \times \Delta W \times \Delta W$$

where, $K_{13}$, $K_{14}$: proportionality constants.

On the other hand, since the dynamical pressure $T_w$ is proportional to the velocity v, it is expressed by $$T_w = K_{15} \times v \qquad (12)$$

where, $K_{15}$: proportionality constant.

Therefore, since the holding force $T_h$ and the dynamical pressure $T_w$ are balanced, $$v = K_{16} \times \Delta W \times \Delta W \qquad (13)$$
$$= K_{17} \times V_{OUT11} \times V_{OUT11}$$

where, $K_{16}$, $K_{17}$: proportionality constants is satisfied. Consequently, by squaring the output voltage $V_{OUT11}$ of the differential amplifier 164 by the square arithmetic circuit 167, the velocity signal $S_{11}$ which is proportional to the velocity v in the direction of the X axis can be obtained.

For instance, when the relative velocity U with the fluid is equal to about 0.01 m/sec, it is sufficient to set the dimension d of the movable micromember 161 so as to satisfy the following relation:

$$d \leq (k_1 \times \rho \times U^2)/(10 \times k_2) \qquad (14)$$

where, $\rho$: density of fluid
$k_1$, $k_2$: proportionality constants

Figure 5:
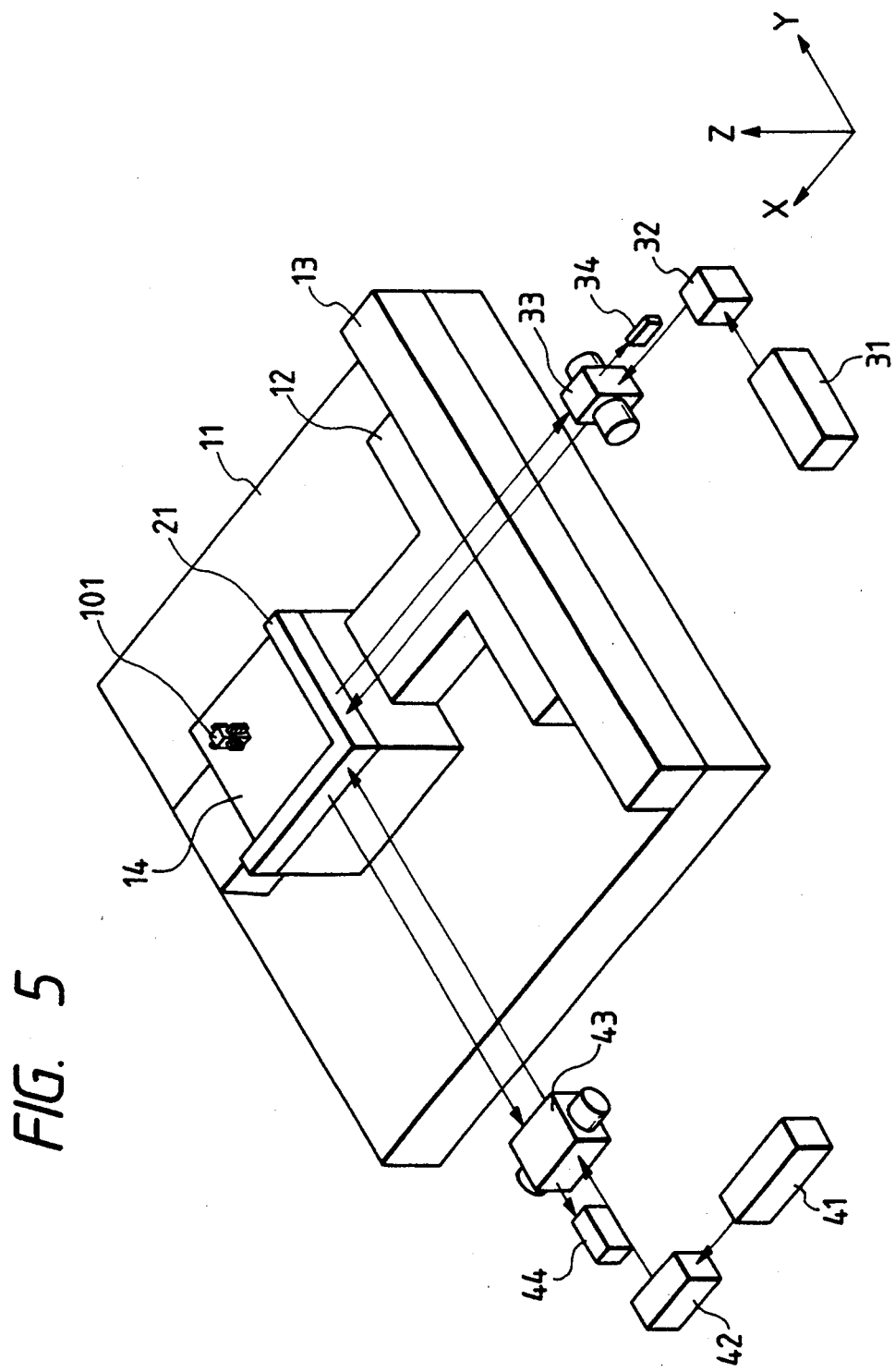
FIG. 5 is a schematic constructional diagram in the case where the X-axis laser interferometer and Y-axis laser interferometer shown in FIG. 6 and two velocity sensors shown in FIGS. 3A and 3B are combined and used as velocity detecting means of the XY stage of the semiconductor exposing apparatus shown in FIG. 6.

FIG. 5 is a schematic constructional diagram in the case where a combination of the X-axis laser interferometer and the Y-axis laser interferometer shown in FIG. 6 and the velocity sensor 101 shown in FIG. 3A is used as velocity detecting means of the XY stage of the semiconductor exposing apparatus shown in FIG. 6.

By fixing the velocity sensor 101 onto the XY stage 14, it is possible to perform the velocity detection in a low velocity range before completion of the positioning, which was difficult in a case of using only the X-axis and Y-axis laser interferometers. Since the velocities in the directions of the X and Y axes can be detected by using one velocity sensor 101, it is sufficient to fix only one velocity sensor 101 onto the XY stage 14.

Since the invention is constructed as mentioned above, the following effects are obtained.

The frictional force or dynamical pressure which is subjected to the movable micromember from the ambient fluid is measured and detected as a velocity, so that:

(1) The velocity can be accurately detected even in a low velocity range before completion of the positioning.

(2) Since the sensor can be manufactured in an extremely small size by the micromechatronics technique using the semiconductor lithography technique, a number of sensors can be easily attached to an object to be measured. Thus, the local velocity of a mechanical part can be detected. The velocity in only the rotating mode is detected, a resistance force is given, a gain of the whole servo system is raised, an accuracy against a disturbance is improved, and the positioning time can be reduced.

An embodiment in which the above velocity sensor is applied to a semiconductor exposing apparatus will now be described.

Figure 7:
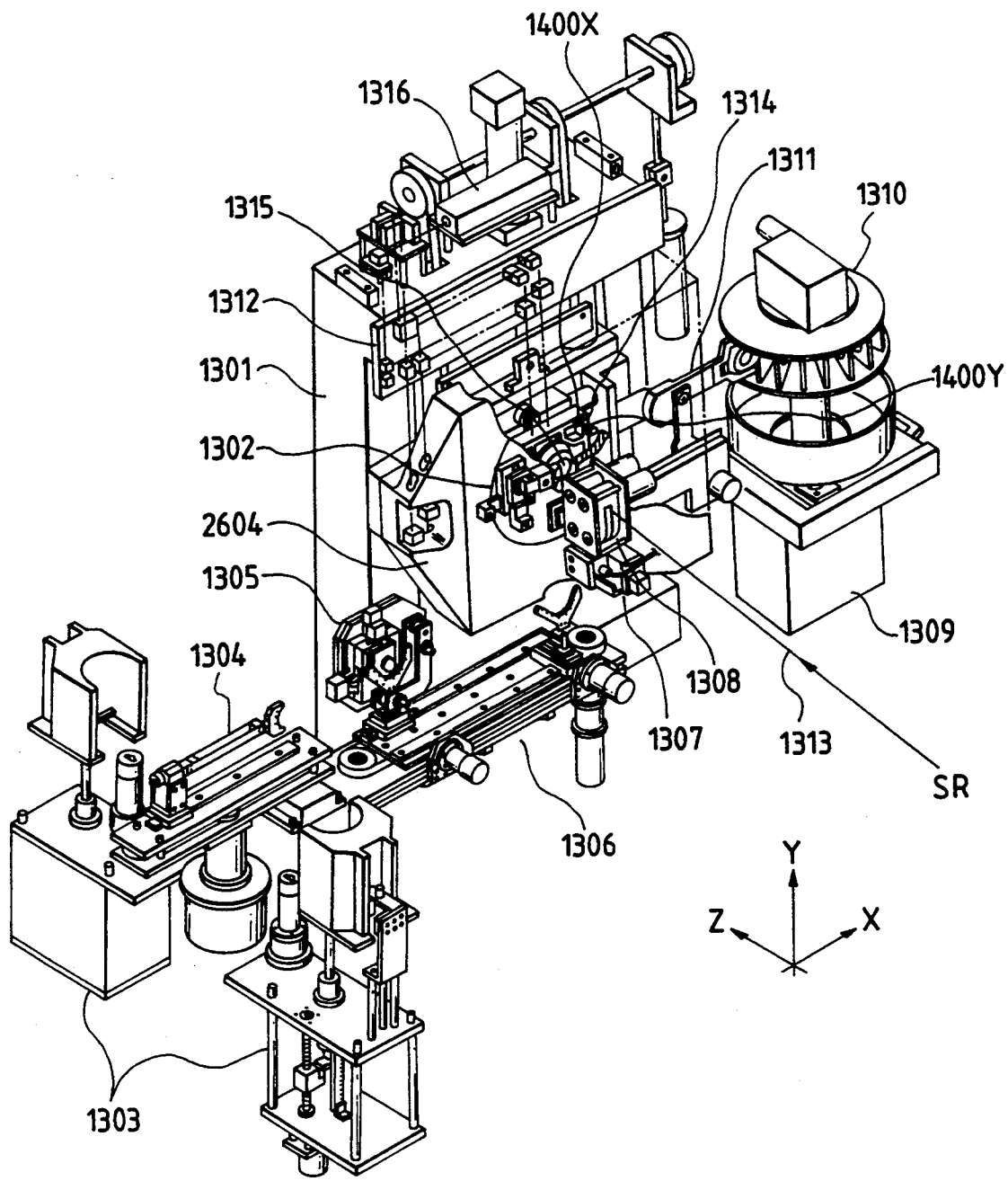
FIG. 7 is a perspective view of an X-ray aligner of a semiconductor exposing apparatus to which the velocity sensor according to the invention is applied.

FIG. 7 is a whole perspective view of an X-ray aligner. Reference numeral 1301 denotes a main frame; 1302 an automatic alignment unit; 1303 a wafer cassette; 1304 a wafer ejector; 1305 an orientation flat detecting base; 1306 a wafer traverser; 1307 a prealignment unit; 1308 a shutter unit; 1309 a mask elevator; 1310 a mask cassette; 1311 a mask feed unit; 1312 a wafer stage position measuring optical system; 1313 an SR light; 1314 a wafer stage; 1315 a wafer; 1316 a laser light source; 1400x and 1400y low velocity sensors of the invention; and 2604 a mask frame. It is now assumed that an exposure atmosphere is filled with He of 150 Torr.

In the above construction, the wafer ejector 1304 first takes out the wafer from the wafer cassette 1303 and puts the wafer onto the orientation flat detecting base 1305. The direction around the z axis of the wafer is corrected. The wafer is subsequently put onto the wafer stage 1314 by the wafer traverser 1306. The positions in the directions of the x and y axes of the wafer are corrected by the prealignment unit 1307. On the other hand, the mask is conveyed from the mask cassette 1310 by the mask feed unit 1311 and is put onto the AA (automatic alignment) frame. The SR light from the SR light source 1313 is shaped into a rectangular shape by the shutter unit 1308 and is irradiated into a pattern region of the mask.

The position of the wafer stage 1314 is measured at a resolution of about 1/1000 micron by a laser interference system comprising the laser light source 1316, measuring optical system 1312, and the like. The wafer stage 1314 is positioned and controlled by a servo circuit (not shown) so as to be moved to a predetermined position. A higher order command to the predetermined position is determined on the basis of an output of the automatic alignment unit 1302.

When the wafer stage comes to a position near the positioning point in the positioning control by the laser interferometers, a differential signal of the outputs of the laser interferometers is hardly obtained. However, the low velocity sensors 1400$x$ and 1400$y$ generate speed signals by detecting the flow of He. The velocity signals are negatively fed back to the servo system and act as attenuating forces, thereby improving the stability of the servo system or realizing the servo system of a high gain.

As described above, in the X-ray exposing apparatus, by using the velocity sensors of the invention in order to detect low velocities at a position near the positioning point, the stability and gain of the servo system can be improved. Thus, the positioning accuracies of the mask and wafer can be improved.

What is claimed is:

1. A velocity sensor including a velocity detecting element, said element comprising:

a movable micromember, which is rotatably supported around a center of gravity, for generating one of a frictional force and a dynamical pressure that is proportional to a velocity of a fluid;

deviation amount detecting means for detecting a deviation amount around the center of gravity of said movable micromember to generate an output voltage, which is proportional to the detected deviation amount;

holding means for providing a holding force, which is proportional to the output voltage of said deviation amount detecting means, to said movable micromember and for holding said movable micromember to a position around the center of gravity; and velocity signal calculating means for calculating a velocity signal from the output voltage of said deviation amount detecting means.

2. A sensor according to claim 1, wherein a dimension d of said movable micromember satisfies $$d \leq (k_1 \times \mu \times U/L)/(10 \times k_2)$$

where, U: relative velocity with the fluid
L: thickness of laminar flow boundary layer
$\mu$: coefficient of friction with the fluid
$k_1$, $k_2$: proportionality constants.

3. A sensor according to claim 1, wherein said movable micromember has a disc-like shape, a group of gearteeth-shaped projections and a position detecting projection are formed around an outer periphery of said movable micromember, a bearing is provided at a position of the center of gravity, said deviation amount detecting means comprises first and second position detecting electrodes which are respectively provided so as to face the position detecting projection of said movable micromember with microgaps therebetween, first and second capacitance detecting circuits to respectively detect an electrostatic capacitance between the position detecting projection and said first position detecting electrode and an electrostatic capacitance between the position detecting projection and said second position detecting electrode, and a differential amplifier to which output signals of said first and second capacitance detecting circuits are respectively supplied, said holding means comprises a driving electrode that includes a plurality of convex portions, each of which is provided so as to face a respective one of the gearteeth-shaped projections of said movable micromember with a respective microgap therebetween, and a voltage amplifier for amplifying an output voltage of said differential amplifier and for supplying the amplified voltage to said driving electrode, and said velocity signal calculating means comprises a square arithmetic circuit to calculate a velocity signal by squaring the output voltage of said differential amplifier.

4. A sensor according to claim 1, wherein said movable micromember has a shape in which a fanshaped portion and a rectangular portion are integrally formed and a bearing is provided at a position of the center of gravity, said deviation amount detecting means comprises first and second position detecting electrodes which are respectively provided so as to face both side surfaces of the fan-shaped portion of said movable micromember with microgaps therebetween, first and second capacitance detection circuits to respectively detect an electrostatic capacitance between the fan-shaped portion of said movable micromember and said first position detecting electrode and an electrostatic capacitance between the fan-shaped portion of said movable micromember and said second position detecting electrode, and a differential amplifier to which output signals of said first and second capacitance detection circuits are respectively supplied, said holding means comprises a driving electrode which is provided so as to face the fan-shaped portion of said movable micromember with a microgap therebetween and a voltage amplifier for amplifying an output voltage of said differential amplifier for amplifying an output voltage of said differential amplifier and for supplying the amplified voltage to said driving electrode, and said velocity signal calculating means comprises a square arithmetic circuit to calculate a velocity signal by squaring the output voltage of said differential amplifier.

5. A sensor according to claim 4, wherein a dimension d of the movable micromember satisfies $$d \leq (k_1 \times \rho \times U^2)/(10 \times k_2)$$

where, U: relative velocity with a fluid
p: density of fluid
$k_1$, $k_2$: proportionality constants..

6. A sensor according to claim 2, wherein said movable micromember has a disc-like shape, a group of gearteeth-shaped projections and a position detecting projection are formed around an outer periphery of said movable micromember, a bearing is provided at a position of the center of gravity, said deviation amount detecting means comprises first and second position detecting electrodes which are respectively provided so as to face the position detecting projection of said movable micromember with microgaps therebetween, first and second capacitance detecting circuits to respectively detect an electrostatic capacitance between the position detecting projection and said first position detecting electrode and an electrostatic capacitance between the position detecting projection and said second position detecting electrode, and a differential amplifier to which output signals of said first and second capacitance detecting circuits are respectively supplied, said holding means comprises a driving electrode that includes a plurality of convex portions, each of which is provided so as to face a respective one of the gearteeth-shaped projections of said movable micromember with a respective microgap therebetween, and a voltage amplifier for amplifying an output voltage of said differential amplifier and for supplying the amplified voltage to said driving electrode, and said velocity signal calculating means comprises a square arithmetic circuit to calculate a velocity signal by squaring the output voltage of said differential amplifier.

7. A semiconductor exposing apparatus comprising an XY stage, wherein a velocity sensor according to any one of claims 1 to 6 is attached to said XY stage for detecting a moving velocity of said XY stage.

8. A semiconductor exposing apparatus comprising an XY stage and a velocity detector attached to said XY stage for detecting a moving velocity of said XY stage, wherein said velocity detector comprises a velocity sensor according to any one of claims 1 to 6.

* * * * *

UNITED STATES PATENT AND TRADEMARK OFFICE
CERTIFICATE OF CORRECTION

PATENT NO. : 5,402,680
DATED : April 4, 1995
INVENTOR(S) : Nobusige KORENAGA

It is certified that error appears in the above-indentified patent and that said Letters Patent is hereby corrected as shown below:

COLUMN 3:

Line 19, "having" should read --of--;
Line 20, "of" should read --having--; and
Line 54, "$d \leq (k_1 \times o \times U/L)/(10 \times k_2)$" should read --$d \leq (k_1 \times \mu \times U/L)/(10 \times k_2)$--.

COLUMN 4:

Line 13, "far" should read --for--.

COLUMN 7:

Line 10, "wellknown" should read --well-known--.

COLUMN 8:

Line 8, "tion 611" should read --tion $61_1$--;
Line 9, "651" should read --$65_1$--;
Line 49, "is" should read --are--; and
Line 52, "BY" should read --By--.

COLUMN 10:

Line 66, "1" should be deleted.

UNITED STATES PATENT AND TRADEMARK OFFICE
CERTIFICATE OF CORRECTION

PATENT NO. : 5,402,680
DATED : April 4, 1995
INVENTOR(S) : Nobusige KORENAGA

It is certified that error appears in the above-indentified patent and that said Letters Patent is hereby corrected as shown below:

<u>COLUMN 12</u>:

Line 11, "constants" should read --constants.--; and
Line 15, "is" should read --are--.

<u>COLUMN 14</u>:

Line 25, "fanshaped" should read --fan-shaped--; and
Line 63, "p:" should read --$\rho$:--.

Signed and Sealed this

Twenty-ninth Day of August, 1995

BRUCE LEHMAN

Attest:

*Attesting Officer*     *Commissioner of Patents and Trademarks*